United States Patent [19]

Foote

[11] 4,299,053
[45] Nov. 10, 1981

[54] COMBINATION CONNECTOR

[76] Inventor: Hilton Foote, R.D. #2, Cornwall Cider Mill Rd., Middlebury, Vt. 05753

[21] Appl. No.: 212,817

[22] Filed: Dec. 4, 1980

[51] Int. Cl.³ .............................................. A01G 23/14
[52] U.S. Cl. ...................................................... 47/52
[58] Field of Search ...................................... 47/50-54, 47/57.5

[56] References Cited

U.S. PATENT DOCUMENTS

| 2,877,601 | 3/1959 | Griggs | 47/52 |
| 2,944,369 | 7/1960 | Soule | 47/52 |
| 3,046,698 | 7/1962 | Breen et al. | 47/52 |
| 3,057,115 | 10/1962 | Bilanin | 47/52 |
| 3,156,069 | 11/1964 | Lamb | 47/51 |
| 3,204,370 | 9/1965 | Lamb | 47/52 |

FOREIGN PATENT DOCUMENTS 673374 11/1963 Canada .................................. 47/52

Primary Examiner—Robert E. Bagwill
Attorney, Agent, or Firm—Willis E. Higgins

[57] ABSTRACT

This combination connector and plug is for use in a sap collecting system in which plastic tubing is connected to a spout inserted in a borehole in the trunk of a tree. A member has an axial passageway for transporting sap between a first fitting for connecting a first plastic tube to the member and a second fitting for connecting a second plastic tube to the member. A projection extends from the member and is dimensioned to fit in sealing engagement in the end of the spout when the spout is removed from the borehole. With the projection placed in the end of the spout, the plastic tubing connector and spout can be stored by hanging them in a sealed condition on one of the tress from which the sap is collected.

7 Claims, 3 Drawing Figures

COMBINATION CONNECTOR

BACKGROUND OF THE INVENTION

1. Field of the Invention

This invention relates to an improved connector for use in systems for collecting sap from trees, especially maple trees, and to a sap collection system incorporating the connector. More particularly, it relates to an improved connector for use in sealing a sap collection system and portions of the system after it has been disconnected from the trees from which it is utilized to gather sap.

2. Description of the Prior Art

The collection of sap from maple trees for the production of maple syrup and sugar probably dates back to prehistoric times. Early colonists in New England learned the practice from the Indians, and it became an important activity in early spring, before other crops could be planted.

As traditionally practiced, the maple sap was collected in buckets hung beneath spouts or taps inserted in the maple tree trunks. The sap was then collected from the buckets and brought to a sugar house centrally located in a grove of maple trees for boiling to produce the syrup and sugar. As practiced in this manner, the production of maple syrup and sugar was a labor intensive operation, but it was performed at a time of the year not suited for many other farm tasks. Over the years, a variety of specialized hardware was developed for this task, including both sap spouts and specialized sap collection buckets, as disclosed in, for example, U.S. Pat. Nos. 225,762; 455,784; 469,791; and 695,841. For many years, however, the basic techniques of maple syrup and sugar production remained essentially unchanged.

More recently, as increasing labor cots made the above hand gathering techniques more uneconomical, systems utilizing plastic tubing to connect the sap spouts in the trees directly to the sugar house or other central collection place were developed. Such systems are described in U.S. Pat. Nos. 2,944,369 and 3,046,698, and may either be gravity fed or utilize pumps to move the sap to the central collection point. As described in those patents, it was contemplated that the spouts of such systems would be left in their boreholes from season to season to prevent bacterial action in the boreholes, thus allowing them to be used again. In practice, such reuse of the boreholes has not proved to be practical. Therefore, it is conventional practice to remove the spouts from the trees after each sap season so that the healing of the boreholes will take place. New boreholes are then drilled and spouts inserted in them in subsequent seasons. In order to reduce the amount of labor associated with disconnection and reinstallation of the plastic pipe sap collection systems, it is usual practice to hang the partially disassembled system from the trees in the maple grove. Because prior art sap collection systems have not been designed with this mode of use in mind, two significant problems have occurred.

Fist, because either a prying tool or a hammer must be used to remove prior art plastic spouts from the tree boreholes, a substantial amount of breakage occurs during such removal. Second, storage of the sap collection systems hanging on the trees has allowed contamination to enter the partially disassembled systems through openings in them. For example, mud wasps will often plug up the spouts if they are left open and hanging on the trees. Although this latter problem has been alleviated by providing separate plastic plugs for insertion into the openings, the necessity for a separate part adds inconvenience to the use of the system.

A further problem associated with the prior art plastic plugs arises when the system is cleaned by forcing water through it. The plastic plugs are blown out of the openings with even a small amount of water pressure. This makes the cleaning operation much more difficult.

SUMMARY OF THE INVENTION

Accordingly, it is an object of this invention to provide a connector for a plastic tubing sap collection system which will also serve to seal the system for storage near the point of use.

It is another object of the invention to provide a sap collection system especially adapted for storage hung on the trees from which the sap is collected, disconnected from the trees and sealed against contamination.

It is a further object of the invention to provide a plastic tubing sap collection system which can be stored hung on the trees from which the sap is collected and in a sealed condition without providing a separate sealing member.

It is yet another object of the invention to provide a plastic tubing sap collection system which can be stored in a sealed condition hung on the trees and which can withstand significant water pressure without blowing the sealing member away.

The attainment of these and related objects may be achieved through use of the novel connector for a plastic tubing sap collection system and novel sap collection system herein disclosed. The combination connector and plug comprises a member having an axial passageway for transporting sap between a first fitting for connecting first plastic tubing to the member and a second fitting for connecting second plastic tubing to the member. The member has a projection extending from it and dimensioned to fit in sealing engagement in the open end of a sap spout when the spout is removed from a borehole in the trunk of a tree. The connector and plug is desirably formed of a resilient plastic material, such as nylon. The projection is preferably substantially cylindrical in shape, for ready insertion in the open end of the spout.

A tree sap collection system in accordance with the invention includes a spout having an open end for insertion in a borehole of a tree trunk. The spout has a fitting for attachment to plastic tubing and a passageway communicating between the open end and the fitting. Plastic tubing is connected between the fitting of the spout and a connector having a body and a fitting extending from the body for engaging the plastic tubing. The body of the connector has a passageway for passing sap through the body. The connector further includes a projection extending from the body and dimensioned to fit in sealing engagement with the open end of the spout when the spout is removed from the borehole. Preferably, both the spout and the connector are formed from nylon or other resilient plastic material. The plastic spout also preferably has a head shaped to be engaged by a wrench for ready removal of the spout from the borehole.

This combination connector and plug and sap collection system incorporating the combination connector and plug, especially when used with a resilient plastic spout designed to facilitate its removal from a tree borehole, gives a sap collecting system that is both convenient to use in accordance with standard practice in the maple syrup industry and low in cost.

The attainment of the foregoing and related objects, advantages and features of the invention should be more readily apparent to those skilled in the art after review of the following more detailed description of the invention, taken together with the drawings, in which:

DETAILED DESCRIPTION OF THE INVENTION

Figure 1:
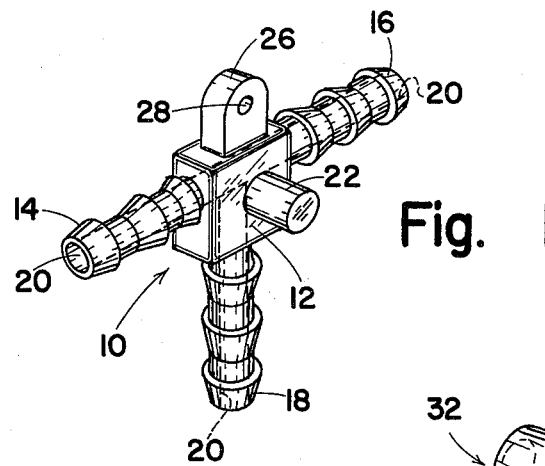
FIG. 1 is a perspective view of a connector and plug in accordance with the invention.

Turning now to the drawings, more particularly to FIG. 1, there is shown a T-connector 10 in accordance with the invention. The connector 10 has a body 12 and first, second and third fittings 14, 16 and 18 for engaging plastic tubing, each extending from the body 12. Each fitting 14, 16 and 18 has an axially disposed passageway 20 extending into the body 12 and through which sap may flow.

The body 12 also has a cylindrical shaped plug 22 extending from its surface, for engaging spout 30 (FIG. 2), as more fully explained below. While the connector 10 may be fabricated of any suitable material, such as a metal or plastic, it is preferred to form it from a resilient plastic material, such as nylon. Conventional molding processes known to those skilled in the plastic fabrication arts can be used to form the connector 10 from nylon.

A tab 26 extending from the body 12 has a mounting hole 28 extending through it, through which a nail or screw may be inserted to mount the connector 10 to the trunk of a tree as part of a sap collection system.

Figure 2:
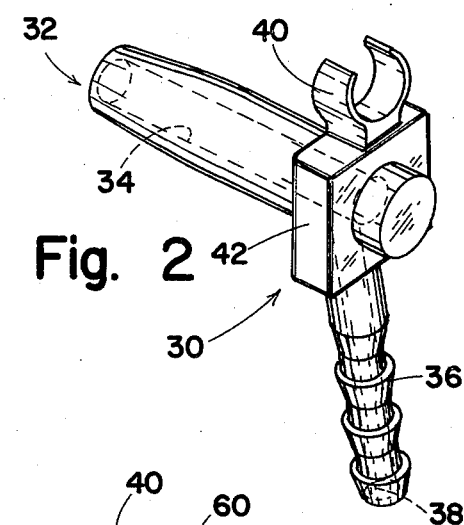
FIG. 2 is a perspective view of a sap spout for use in a system in accordance with the invention.

FIG. 2 shows a sap sout 30 for use in a sap collection system in accordance with the invention. The spout 30 has an open end 32 for insertion in a borehole in the trunk of a tree. Axially disposed passageway 34 extends into a head 34 of the spout 30. Fitting 36 is provided for connecting the spout 30 to plastic tubing, as in the case of connector 10. The fitting 36 also has an axial passageway 38 extending into the head 34 and intersecting with the axial passageway 34 to provide a path of flow of sap through the spout 30. Head 34 has an essentially square shape for engagement by a wrench to allow easy removal of the end 32 of spout 30 from a borehole in the trunk of a tree. Clip 40 is dimensioned to receive the plastic tubing when it is desired to coil the tubing around the spout 30. As in the case of the connector 10, the spout 30 may be fabricated from any suitable metal or plastic, but a resilient plastic material, such as nylon, is preferred.

Figure 3:
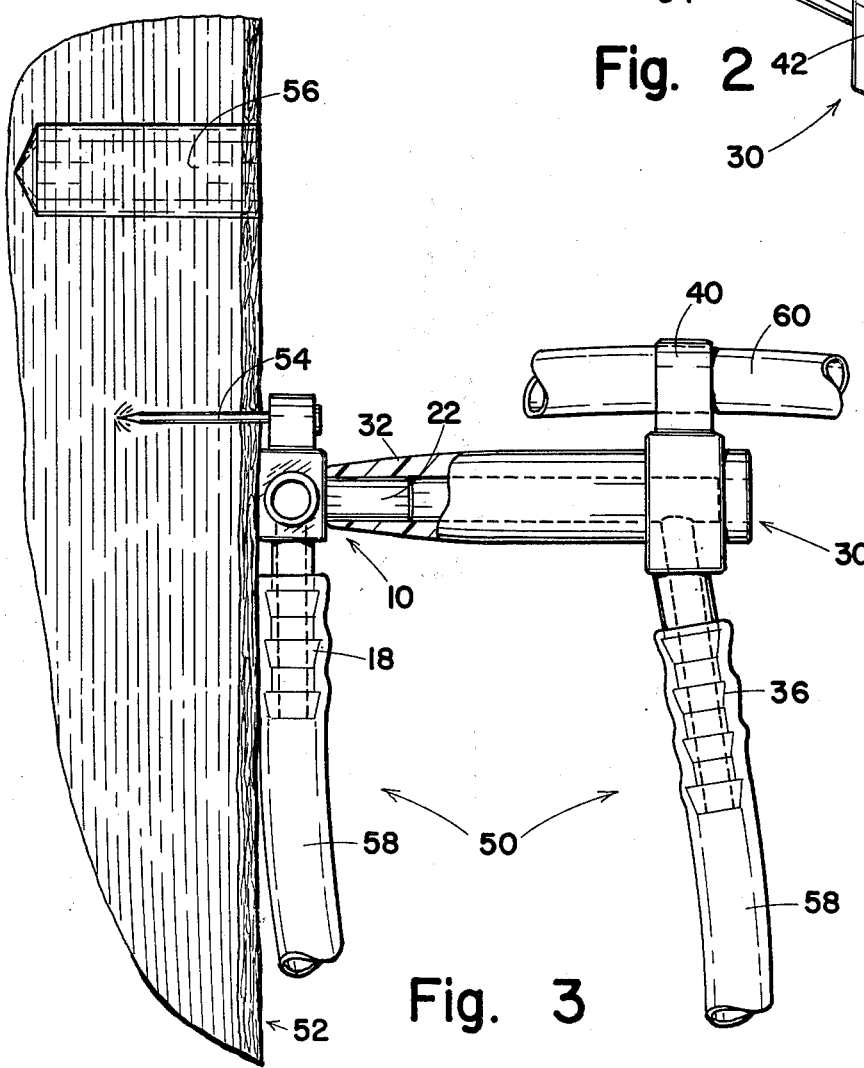
FIG. 3 is a side view, with partial cutaways to show detail, of a portion of a sap collection system in accordance with the invention, showing how it is stored.

FIG. 3 shows how the sap collection system 50 of this invention is stored through utilization of the combination connector and plug 10. The connector 10 is mounted on a tree trunk 52 through use of a nail or screw 54, with the plug 22 extending outward. Opening 32 of the spout 30, which has been removed from a borehole 56 in the tree trunk 52, is fitted onto the plug 22 as shown. Plastic tubing 58 of the collection system connects fitting 18 of the connector 10 and fitting 36 of the spout 30. Plastic tubing 60 forming another part of the collection system and shown in clip 40, connects fittings 14 and 16 of the T-connector 10 (see FIG. 1) to provide a closed system during storage. Sine the borehole 56 is left exposed to the air, normal healing of it takes place after the sap collection season. In a subsequent season, a new borehole corresponding to the borehole 56 is bored at another location on the tree trunk 52, and the end 32 of spout 30 is inserted in the new borehole in a conventional manner.

The system 50 must be cleaned between uses. This can be easily accomplished by connecting a source of pressurized water to one end of the system and allowing the water to flush out the other end. In practice, the system of this invention is able to withstand a water pressure greater than 100 pounds per square inch gauge without separating plugs 22 from their openings 32.

Since use of the sap collection system 50 during the sap collection season is otherwise conventional and known to those skilled in the art, it will not be described further.

It should now be apparent to those skilled in the art that a novel combination connector and plug for use in a sap collection system and sap collection system capable of achieving the stated objects of the invention has been provided. By allowing the parts of the sap collection system to be stored as a closed loop while hung on a tree from which sap is collected, contamination from air-borne or insect-borne dirt or other contaminants is avoided, without requiring the use of extra parts in the system.

It should further be apparent to those skilled in the art that various changes in form and detail of the invention as shown may be made. For example, the plug 22 could be provided as part of a straight connector having only two fittings, rather than the T-connector 10 as shown. If desired, a separate hook or other means would be provided on the tree trunk 52 for supporting the sap collection system 50 during its storage. It is intended that such changes be included within the spirit and scope of the claims appended hereto.

What is claimed is:

1. A combination connector and plug for use in a sap collecting system in which plastic tubing is connected to a spout having an open end inserted in a borehole in the trunk of a tree, comprising a member having an axial passageway for transporting sap between a fist fitting for connecting first plastic tubing to said member and second fitting for connecting second plastic tubing to said member, and a projection extending from said member and dimensioned to fit in sealing engagement in the end of the spout when the spout is removed from the borehole.

2. The connector of claim 1 formed of a resilient plastic material and in which said projection is substantially cylindrical in shape.

3. The connector of claim 2 in which the resilient plastic material is nylon.

4. In a tree sap collection system, the combination comprising:
   a spout having an open end for insertion in a borehole of a tree trunk, a fitting for attachment to plastic tubing, and a passageway communicating between the open end and the fitting,
   plastic tubing connected between the fitting of said spout and a connector having a body with a passageway for sap extending through the body and a fitting extending from said body for engaging said plastic tubing, said connector further including a projection extending from said body and dimensioned to fit in sealing engagement with said open end when said spout is removed from the borehole.

5. The combination of claim 4 in which said spout and said connector are formed from a resilient plastic material and in which the projection of said connector is substantially cylindrical in shape.

6. The combination of claim 5 in which the resilient plastic material is nylon.

7. The combination of claim 4 in which said spout further has a head shaped to be engaged by a wrench for removing the spout from the borehole.

* * * * *